Patented Mar. 10, 1953

2,631,086

UNITED STATES PATENT OFFICE 2,631,086

WATER GAS SHIFT CATALYST PREPARATION AND WATER GAS SHIFT PROCESS

Ottis W. Moak and William E. Spicer, Baton Rouge, La., assignors to Standard Oil Development Company, a corporation of Delaware No Drawing. Application October 27, 1949, Serial No. 123,995

11 Claims. (Cl. 23—212)

The present invention relates to the preparation of hydrogen by the reaction between a hydrocarbon, usually methane, and steam in the presence of a reformer catalyst to produce mixtures of $H_2$ and CO, and the treatment of this gaseous mixture with further quantities of steam in the presence of a carbon monoxide converter catalyst. More specifically, the present invention relates to an improved process for the preparation of a carbon monoxide converter catalyst wherein is obtained a catalyst having a more rugged nature and a higher activity than those hitherto produced.

In the manufacture of hydrogen by the reaction of steam with hydrocarbons at elevated temperatures, it is well known to carry out the process in two stages, wherein in the first stage, methane or other gaseous hydrocarbons are reacted with preferably an excess of steam in the presence of well-known reformer catalysts containing nickel, cobalt, etc., promoted with magnesia, alumina, thoria and similar oxides, and supported, if desired, on an inert base. The temperatures usually employed are in the order of 1200°–1400° F. and higher, and as a result of the reaction, $H_2$, $CO_2$ and CO are obtained and, because of the high temperature required to promote the reformation of methane, the ratio of CO to $CO_2$ in the product is high. In order to increase the yield of $H_2$ the reaction mixture is passed from the first stage to a second stage, which is operated at a much lower temperature, in the neighborhood of about 800° F., and further quantities of steam are generally added to the gas. In this stage the carbon monoxide produced in the first stage is converted to carbon dioxide and additional hydrogen in accordance with the water-gas shift reaction, and the second stage is catalyzed by CO converter catalysts rich in iron oxide, admixed with one or more of a variety of other metals or metal oxides. Since carbon monoxide conversion is limited by water-gas shift equilibrium considerations, complete conversion of CO to $CO_2$ is not realized.

Where hydrogen of a higher purity is required, the gas from the water-gas shift reaction, after condensation of the excess water vapor and removal of the carbon dioxide, can be mixed with additional steam, heated to an elevated temperature and passed over another quantity of carbon monoxide conversion catalyst. This results in conversion of a major portion of the residual carbon monoxide to carbon dioxide with the formation of additional hydrogen. If an even higher purity is required the above procedure can again be repeated after removal of the carbon dioxide. The carbon monoxide can also be removed by absorption in a selective solvent, usually a solution of a copper salt, or it may be hydrogenated to methane by passing the gas over a suitable catalyst. These additional steps would be simplified or made unnecessary if an active catalyst were available which would promote the water-gas shift reaction at a sufficiently low temperature.

One of the problems associated with carbon monoxide converter catalysts is their tendency to be fragmented and crushed under the reaction conditions, resulting in formation of fines, dustiness, and other undesirable conditions, preventing this use under conditions of high gas velocities, thus seriously limiting plant throughputs.

The first steps in one customary process of preparing converter catalyst consist in impregnating iron oxide with a solution of a promoter, such as chromic nitrate to form a slurry, which is then heated in a furnace to drive off the water and to decompose the nitrates to oxides. The oxides are then wetted with water and extruded to the desired size. The pellets so formed are then dried in a steam heated oven at about 300°–310° F. to remove the moisture.

Converter catalysts prepared by the general process as outlined above possess a rather low crushing resistance or side strength. By side strength reference is had to the testing method wherein a pellet is laid on its side and the force necessary to crush and disintegrate the latter is determined in a conventional catalyst crushing machine. The dried pellets are found to have an average side strength of about 10 pounds, which is far too low for the catalyst to hold up under plant operating conditions. To be employable on a commercial scale, this side strength must be increased up to at least 45 pounds for a ⅜″ pellet, and the higher strength the better.

Neither catalytic activity alone nor physical composition of a catalyst per se is a criterion of the suitability of a given substance or mixture for use in the process. The choice of catalyst is governed by a variety of factors of which catalytic activity is but one of importance, and the robustness of the material and economy of its preparation are of equal significance, as in the method of preparation of the catalyst. Thus, in a recent article by Christain and Boyd in Chemical Engineering, May 1949, it was shown that though three of the five principal commercial carbon monoxide conversion catalysts were of comparable composition, commercial practice has shown that their performance is different and this difference is attributed to the method of manufacture rather than to any small difference in composition. The authors conclude that the method of manufacture has a large influence on the activity of a catalyst, and is a major factor in determining the physical properties. Thus, size of catalyst particles must be such that the allowance pressure drop across the catalyst bed will not be exceeded under operating conditions. However, some catalysts, when subjected to relatively high space velocities, are partially reduced to a dust which accumulates in the catalyst bed. Channeling of the gas flow, increased pressure drop and unsatisfactory conversion of carbon monoxide result from dusting, and eventually the operation has to be interrupted and the catalyst either removed and screened, or discarded and replaced with the fresh catalyst.

Prior to the present invention, it has been found that the physical resistance to disintegration, as measured in terms of side strength, could be substantially increased by subjecting the dried catalyst, prepared by impregnating iron oxide with a solution of chromic nitrate to form a slurry which is then heated in a furnace to drive off water and decompose nitrates into oxides, to a roasting process in the presence of a stream of air. The effect of this roasting was not only to increase the strength of the catalyst but also to decompose completely, salts, such as nitrates. In general, the heat treatment was carried out for about 8 hours at about 1050° F. The table below indicates the effect of this heat treatment with air at increasing temperature levels, all carried out in periods of 8 hours.

| Temperature of Treatment in Air, ° F. | Average Side Strength |
| --- | --- |
| 900 | 20 |
| 1,000 | 44 |
| 1,100 | 57 |
| 1,200 | 54 |
| 1,300 | 55 |
| 1,600 | 44 |

The above data indicate that a treating temperature of greater than 1000° F. and less than 1600° F. is necessary to produce catalyst of sufficient ruggedness.

It has also been found, however, as a result of much experimental and commercial operation that the activity of the converter catalyst, as measured in terms of percentage of CO in the exit gas from the CO conversion unit, decreases as the temperature of heat treatment increases, the following table showing in a general way the manner in which this decrease takes place.

| Temperature of Treatment in Air, ° F. | Percent of CO in Exit Gas |
| --- | --- |
| 950 | 1.4–1.6 |
| 1,000 | 1.6–1.7 |
| 1,100 | 1.8–2.1 |
| 1,600 | 2.2–2.6 |

Thus, at those activation temperatures resulting in highly active catalyst, the former has a low side strength. When side strength is raised, activity falls.

When CO is present in the hydrogen leaving the converter and the hydrogen is employed in hydrogenation processes, the CO will be converted to $CH_4$. Because of the enormous quantities of hydrogen thus manufactured and thus employed, the methane concentration will rapidly build up to such a high degree that, in the hydrogenation process, some of the gas will continually have to be bled off that ordinarily would be recycled, and thus relatively small differences in CO content of the hydrogen gas feed to a hydrogenation process can have a very appreciable effect on the operating cost. For this reason, the importance of reducing the CO content even by a little as 0.1–0.3% of the total converter effluent cannot be overemphasized.

It is thus apparent that in accordance with prior art practice, a compromise must be effected between the higher catalyst treating temperatures favoring increased catalyst strength, and the lower temperatures favoring increased activity. In general, a temperature of 1050° F. is employed, resulting in an average side strength of about 45 and an activity, as expressed in percent CO in effluent from the converter, of about 1.8 to 2.0.

Besides the problem of activity and durability of the converter catalyst prepared as indicated above, the method of preparation of such a catalyst, which consists of about 93% $Fe_2O_3$ and 7% $Cr_2O_3$, is tedious and lengthy, requiring, as it does, seven distinct steps, namely (1) impregnation, (2) drying and decomposition of nitrates, (3) wetting for extrusion, (4) extrusion, (5) drying, (6) activating, and (7) screening. Furthermore, the decomposition of nitrates poses the problem of disposing of the objectionable oxides of nitrogen, for which there must be made suitable provisions. It is highly desirable, therefore, to produce a CO converter catalyst which may be prepared in a more simple fashion, and which will be more stable to heat and show higher conversion levels and durability characteristics than the conventional catalyst prepared, as outlined above, from iron oxide and chromic nitrate.

It is, therefore, the principal object of the present invention to prepare an exceptionally active carbon monoxide conversion catalyst in a form having a much greater physical strength and showing a greatly decreased tendency towards dusting than conventionally prepared catalysts.

It is also an object of the present invention to prepare a better conversion catalyst for CO comprising chromium and iron by a process considerably more simplified than conventional processes.

A further object of the invention is to prepare a carbon monoxide conversion catalyst which is more stable to heat and to water than those prepared hitherto.

Other and further objects of the invention will appear from the description hereinafter.

It has now been found that an exceptionally rugged and active converter catalyst comprising iron and chromium may be prepared in a considerably more simplified manner than possible hitherto, by employing chromium trioxide instead of chromium nitrate and by a process of operation described more fully below. The conventional process starts with a mixture of chromium nitrate and red iron oxide; the improved process employs $CrO_3$, instead of chromium nitrate. Since the amount of water required to dissolve the necessary amount of $CrO_3$ is smaller than the amount required to dissolve the necessary amount of $Cr(NO_3)_3$ and since the amount of water used to dissolve the $CrO_3$ is adjusted to exactly the amount required for extrusion, the process is simplified by the elimination of a wetting and drying step. The solubility of $Cr(NO_3)_3$ in water is substantially less than that of chromic acid, in terms of total amount of chromium that may be dissolved.

Furthermore, in accordance with the process of the present invention the decomposition of the nitrates, with accompanying problems of disposing of the objectionable oxides of nitrogen, is eliminated. There is obtained a catalyst consisting essentially of oxides of iron and chromium which is substantially identical in composition with the catalyst prepared by conventional means, but which, because of its manner of preparation, is considerably superior in activity and durability to the conventionally prepared converter catalyst.

In order to illustrate the invention, below are set forth specific examples describing the improvement in catalyst preparation. Example I describes the conventional process for preparing a catalyst consisting essentially of 93% $Fe_2O_3$ and 7% $Cr_2O_3$, while Example II describes a process for preparing the catalyst of the present invention which, though having substantially the same chemical composition, has far superior properties.

EXAMPLE I

A batch of CO conversion catalyst was prepared by impregnating in a mixer about 300 pounds of red iron oxide ($Fe_2O_3$) with 11.5 gallons of chromic nitrate (50% solution). It takes this large amount of water to dissolve the chromic nitrate. However, this mixture is too wet to extrude and too dry to feed readily to the Herreshoff furnace. Accordingly, five gallons of water were added to make a slurry, which was conveyed to a Herreshoff furnace, wherein it was heated at about 550° F. In this stage, substantially all of the water is driven off and most of the nitrates are decomposed to oxides. However, in this drying step, about 3-4% of the material is lost out of the furnace stacks as a fine powder.

The resulting mixture consisting of about 93% iron oxide and 7% chromium oxide is then wetted with water in a mixer to facilitate extrusion, approximately 7 gallons water/300 pounds of oxides being required. After extrusion and pelleting, the pellets are dried with steam at about 300° F., to remove most of the moisture and to prevent cracking of the pellets on subsequent heating at higher temperatures. The dried pellets are then activated in an atmosphere of air in an electric furnace for about eight hours at 1050° F. These are the time and temperatures required to decompose thoroughly all the nitrates and to make the pellets sufficiently strong, imparting an average side strength of about 50 pounds. The pellets after activation were screened to remove fines.

EXAMPLE II

As an example of preparing catalyst in accordance with the present invention, about 150 pounds of red iron oxide ($Fe_2O_3$), 30 pounds chromic acid ($CrO_3$) and 5.5 gallons of water were made into a paste in a mixer and, after thorough mixing, another 150 pounds of iron oxide were blended in and mixed well. The resulting material was next extruded to the desired size, to pellets of about $\tfrac{3}{16}''-\tfrac{3}{4}''$ being the usual plant size. It may be noted here that, for the same consistency, the chromic acid containing material was more readily extruded than the conventional type material, and thus, a drier material may be extruded than by the old process, eliminating the necessity of a separate low temperature drying step prior to activation. The pellets were dried and activated in an electric furnace for 8 hours at 1100° F., which temperature was found to give the best activity and strength, and at which temperature $CrO_3$ is converted into $Cr_2O_3$. After activation the pellets were screened to remove fines. The elimination of the drying step before extrusion eliminated dust losses as well.

Comparing the two processes, therefore, it can be seen that in accordance with the present invention, three steps are eliminated.

| Old Process | New Process |
| --- | --- |
| (1) Impregnation in Mixer. | (1) Impregnation in Mixer. |
| (2) Drying in Furance at 550° F. | (2) Extrusion. |
| (3) Wetting for Extrusion in Mixer. | (3) Activation at 1,100° F. |
| (4) Extrusion. | (4) Screening. |
| (5) Drying at 300° F. | |
| (6) Activation at 1,050° F. | |
| (7) Screening. | |

A comparison of activity of the two types of catalyst is given in the table below in Example III.

EXAMPLE III

Catalysts prepared by both processes were tested for activity in a carbon monoxide conversion unit. As feed gas, CO, $CO_2$, $H_2$, and steam, representing the effluent from a prior methane reforming unit, were employed.

*Comparison of activity of water-gas shift catalyst: 7% $Cr_2O_3$; 93% $Fe_2O_3$*

| Catalyst Mfg. Process | Old | New |
| --- | --- | --- |
| Vol. Catalyst cc. (4-8 mesh) | 45 | 45 |
| Wt. Catalyst grams | 69 | 75 |
| Inlet Gas, l./Hr. | 20 | 20 |
| Steam, l./Hr. | 66 | 66 |
| Inlet Gas, V./V./Hr. | 445 | 445 |
| Steam, V./V./Hr. | 1,473 | 1,473 |
| Temperature, ° F. | 825 | 825 |
| Feed Gas Composition: | | |
| Percent CO, Vol. Percent | 30.6 | 30.6 |
| Percent $CO_2$, Vol. Percent | 8.3 | 8.3 |
| Percent $H_2$, Vol. Percent | 61.1 | 61.1 |
| Exit Gas: | | |
| Percent CO | 2.0 | 1.4 |
| Percent $CO_2$ | 27.6 | 28.6 |
| Percent $H_2$ | 70.4 | 70.0 |

EXAMPLE IV

To show that these high activities are obtained consistently, the table below shows the CO effluent from composites from commercial plant production, employing the new catalyst.

| Sample | Percent CO in Effluent |
| --- | --- |
| March 3-6 | 1.4 |
| March 11-13 | 1.3 |
| March 18-20 | 1.3 |

At the temperature level of 800°-900° F., which is most desirable for operating the water gas shift, or carbon monoxide conversion reaction, the equilibrium value in terms of unconverted CO is about 1.2%.

With the conventional commercial catalysts under commercial operating conditions, the CO in the effluent is in the neighborhood of 2.0-2.5%.

Examples III and IV clearly indicate the superior activity of the conversion catalyst prepared in accordance with the present invention. Besides the examples cited, numerous other examples may be given.

As already indicated, it is necessary to heat converter catalyst to relatively high temperatures in order to obtain the necessary physical strength for commercial use; otherwise, the particles will fall apart in the plant, with inefficient operation resulting. However, it has been found that heating the catalyst may impair activity and, as already shown with conventional catalyst, a compromise must be reached between activity and physical strength; that is, above a certain temperature level, about 1000°–1100° F., increasing the temperature of activation increases the strength but markedly decreases the activity. With the new catalyst, however, activation may be carried out at considerably higher temperatures without accompanying loss in activity. Thus, in the following table it may be seen that catalyst from the improved process has not only a greater heat stability but also greater physical strength than that prepared by the conventional process.

| Activation Temperature, ° F. | Conventional Catalyst | | New Catalyst | |
| --- | --- | --- | --- | --- |
| | Pellet Strength (Average), Pounds | Percent CO in Product | Pellet Strength (Average), Pounds | Percent CO in Product |
| 900 | 20 | | | |
| 950 | | | 40 | 1.6 |
| 1,000 | 44 | | | |
| 1,050 | | | 93 | 1.4 |
| 1,100 | 57 | 2.0 | 92 | 1.4 |
| 1,150 | | | 90 | 1.3 |
| 1,200 | 54 | | | |
| 1,250 | | | 88 | 1.7 |
| 1,300 | 55 | | | |
| 1,600 | 44 | 2.2 | | |

These data show not only the greater heat stability of the new catalyst, but also its greater strength.

Thus to summarize, the advantages of a $Cr_2O_3$–$Fe_2O_3$ catalyst prepared in accordance with the present invention over a conventionally prepared catalyst are as follows:

(1) Better activity.
(2) Better physical strength.
(3) Catalyst does not break down when wet with water; sometimes in the operation of plants for carrying out the water-gas shift reaction, the catalyst may become wetted with water, and it is important that the particles be able to withstand this wetting treatment without physical disintegration. It has been demonstrated that the improved catalyst does not lose physical strength when wetted, while the unimproved is seriously weakened.
(4) Better heat stability.
(5) Less expensive catalyst in terms of chemicals, labor and transportation.
(6) Better gas for hydrogenation processes, as it contains less CO.
(7) By eliminating the conventional wetting and drying steps, 3.5–4% losses of material are prevented.
(8) Since the mixture produced in the modified procedure is not as wet at the time of extrusion as that produced by older processes, the extruded catalyst from the modified process can be sent at once to the activation furnace without going through a preliminary drying step.

Numerous modifications of the invention are readily apparent to those skilled in the art. Thus, small variations in the ratios of the components of the final catalyst, or in the ratio of chromic acid and iron oxide fed initially, are within the scope of the invention.

Thus, in accordance with the present invention, there is obtained a water gas shift catalyst which, when employed in a carbon monoxide conversion zone operated in the neighborhood of about 800°–900° F., reduces the CO content of the effluent from a methane or natural gas reforming zone to substantially equilibrium proportions. This catalyst combines a high activity with an exceptional degree of ruggedness.

What is claimed is:

1. An improved process for converting a gaseous mixture comprising CO, $CO_2$, and $H_2$ into a product rich in hydrogen and low in carbon monoxide which comprises passing said mixture and steam through a carbon monoxide conversion zone in the presence of a CO converter catalyst comprising a major portion of $Fe_2O_3$ and a minor portion of $Cr_2O_3$ prepared by impregnating iron oxide with an aqueous solution of chromic acid, extruding and pelleting the resulting mixture and activating the pellets at temperatures in the range of 1000°–1300° F.

2. The process of claim 1 wherein said gaseous mixture passed to the conversion zone comprises effluent from a methane reforming zone.

3. An improved process for converting a gaseous mixture comprising CO, $CO_2$ and $H_2$ into a product rich in hydrogen and low in carbon monoxide which comprises passing said mixture and steam through a carbon monoxide conversion zone in the presence of a CO converter catalyst comprising about 93% $Fe_2O_3$ and about 7% $Cr_2O_3$ prepared by impregnating iron oxide with an aqueous solution of chromic acid, extruding and pelleting the resulting mixture and activating the pellets at temperatures in the range of about 1000° to about 1300° F.

4. In the process of producing a catalyst comprising a major proportion of $Fe_2O_3$ and a minor proportion of $Cr_2O_3$ adapted to promote the water gas shift reaction, the improvement which comprises impregnating iron oxide with an aqueous solution of chromic acid to form a paste-like mixture, extruding the resulting mixture, activating the extruded material at elevated temperatures in the range of about 1000 to 1300° F., and recovering a carbon monoxide converter catalyst comprising a major proportion of $Fe_2O_3$ and a minor proportion of $Cr_2O_3$.

5. The process of claim 4 wherein said extruded material is pelleted.

6. In the process of producing a water gas shift catalyst consisting essentially of ferric oxide and chromic oxide, the improvement which comprises forming a slurry of ferric oxide, chromic acid, and water in a mixing zone, adding a further quantity of ferric oxide to said slurry to produce a material suitable for extruding, extruding the latter, pelleting said extruded material, activating said pellets in the presence of air at a temperature of about 1050°–1250° F. for a period up to about 8 hours, and obtaining a highly active catalyst of exceptional ruggedness comprising a major proportion of ferric oxide and a minor proportion of chromic oxide.

7. The process of producing an improved water gas shift catalyst consisting essentially of about 93% $Fe_2O_3$ and about 7% $Cr_2O_3$ which comprises impregnating iron oxide with an aqueous solution of chromic acid to form a paste-like mixture, extruding the resulting mixture and activating the extruded material at temperatures of about 1000 to about 1350° F.

8. The process of producing an improved water gas shift catalyst consisting essentially of about 93% $Fe_2O_3$ and of about 7% $Cr_2O_3$ which comprises forming a slurry of ferric oxide, chromic acid and water in a mixing zone, adding a further quantity of ferric oxide to said slurry to produce a material suitable for extruding, extruding the latter, pelleting said extruded material, activating said pellets in the presence of air at a temperature of about 1050° to about 1250° F. for a period of up to about 8 hours and obtaining a highly active catalyst of exceptional ruggedness.

9. An improved carbon monoxide conversion catalyst adapted to promote the water gas shift reaction comprising essentially a major portion of ferric oxide and a minor portion of chromic oxide, said catalyst having a pellet crushing strength of at least 80 pounds at an activity level corresponding to substantially equilibrium carbon monoxide conversion in the temperature range of about 800°–900° F., said catalyst being prepared by impregnating iron oxide with an aqueous solution of chromic acid to form a paste-like mixture, extruding the resulting mixture and activating the extruded material at a temperature of from about 1000° to about 1300° F.

10. The catalyst of claim 9 wherein said catalyst consists essentially of 93% $Fe_2O_3$ and 7% $Cr_2O_3$.

11. The catalyst of claim 9 wherein said catalyst has a crushing strength greater than 90 pounds.

OTTIS W. MOAK.
WILLIAM E. SPICER.

REFERENCES CITED

The following references are of record in the file of this patent:

UNITED STATES PATENTS

| Number | Name | Date |
| --- | --- | --- |
| 1,107,581 | Brownlee et al. | Aug. 18, 1914 |
| 1,330,772 | Bosch et al. | Feb. 10, 1920 |
| 1,934,795 | Frazer | Nov. 14, 1933 |
| 2,408,140 | Gutzeit | Sept. 24, 1946 |
| 2,461,147 | Davies | Feb. 8, 1949 |